(12) United States Patent
Mcloyd

(10) Patent No.: US 11,958,417 B2
(45) Date of Patent: Apr. 16, 2024

(54) UNIVERSAL SEATBACK MOUNT FOR ELECTRONIC DEVICES

(71) Applicant: Dennis Earl Mcloyd, Lithonia, GA (US)

(72) Inventor: Dennis Earl Mcloyd, Lithonia, GA (US)

(73) Assignee: The MACK LLC, Litwonia, GA (US)

( * ) Notice: Subject to any disclaimer, the term of this patent is extended or adjusted under 35 U.S.C. 154(b) by 0 days.

(21) Appl. No.: 17/373,735

(22) Filed: Jul. 12, 2021

(65) Prior Publication Data

US 2022/0009423 A1   Jan. 13, 2022

Related U.S. Application Data

(60) Provisional application No. 63/050,423, filed on Jul. 10, 2020.

(51) Int. Cl.
*B60R 11/02* (2006.01)
*B60R 11/00* (2006.01)

(52) U.S. Cl.
CPC ... *B60R 11/0252* (2013.01); *B60R 2011/0015* (2013.01); *B60R 2011/0017* (2013.01); *B60R 2011/0071* (2013.01); *B60R 2011/0075* (2013.01)

(58) Field of Classification Search
CPC ......... B60R 11/0252; B60R 2011/0015; B60R 2011/0017; B60R 2011/0071; B60R 2011/0075
See application file for complete search history.

(56) References Cited

U.S. PATENT DOCUMENTS

| 5,370,060 | A   | * | 12/1994 | Wang    | B60N 3/004  |
|           |     |   |         |         | 297/163     |
| 7,448,688 | B2  | * | 11/2008 | Farah   | A47C 16/02  |
|           |     |   |         |         | 297/217.7   |
| 7,862,112 | B2  | * | 1/2011  | Caturla | B60R 11/0235|
|           |     |   |         |         | 297/188.06  |
| 8,424,825 | B2  | * | 4/2013  | Somuah  | B60R 11/0235|
|           |     |   |         |         | 248/316.4   |
| 8,864,226 | B2  | * | 10/2014 | Fan     | B60R 11/02  |
|           |     |   |         |         | 297/188.05  |
| 10,118,526| B1  | * | 11/2018 | Fan     | B60N 2/882  |
| 10,343,612| B1  | * | 7/2019  | Allred  | B60R 7/043  |
| 10,882,460| B2  | * | 1/2021  | Yu      | B60R 11/02  |

* cited by examiner

*Primary Examiner* — Philip F Gabler

(57) ABSTRACT

A system or device for mounting personal electronics such as tablet computers, smart phones, or laptops to seatbacks during travel. The device uses a series of jointed elements to allow for securing the device to a variety of seatbacks commonly found in automobiles, buses, trains, aircraft, and watercraft. The device also allows for personal electronics of varying shapes, sizes, and configurations to be secured to the seatback through the device so that a user may comfortably use his or her personal electronics without interfering with a tray table or requiring the user to hold his or her personal electronic items.

14 Claims, 13 Drawing Sheets

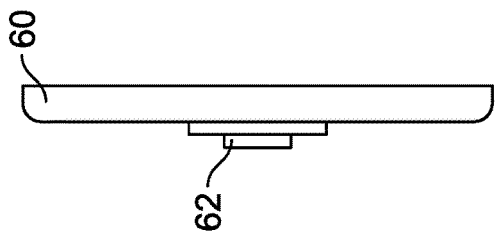
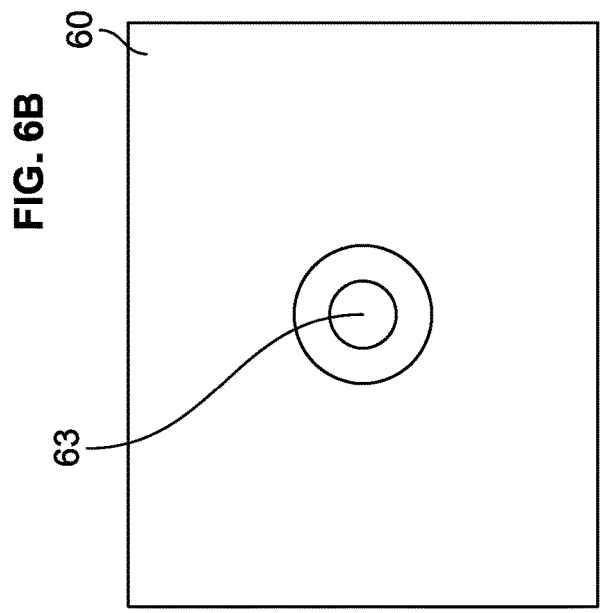
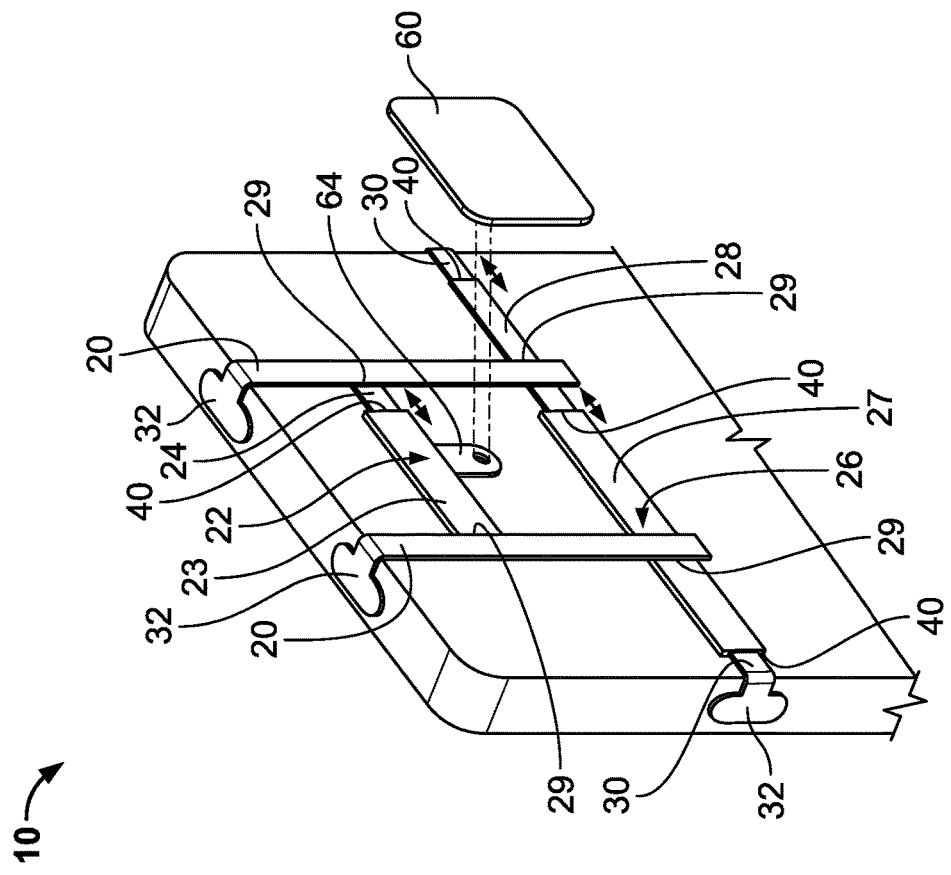
FIG. 6B
FIG. 6C
FIG. 6A

UNIVERSAL SEATBACK MOUNT FOR ELECTRONIC DEVICES

CROSS REFERENCE TO RELATED APPLICATIONS

The present application claims priority under 35 U.S.C. § 119(e) from U.S. Provisional Application Ser. No. 63/050,423, filed Jul. 10, 2020, entitled "Apparatus for Holding Electronic Devices Onto Seatbacks;" the disclosure of which is hereby incorporated by reference herein in its entirety.

FIELD OF THE INVENTION

The present invention relates generally to the field of accessories for personal electronics devices. More specifically, the invention is in the subfield of mounts and holders for personal electronics devices.

BACKGROUND OF THE INVENTION

Travel, whether by airplane, car, train, bus, or other conveyance, often requires passengers to stay seated in a confined space for prolonged periods of time. Passengers often desire some form of entertainment during their trip. Certain modes of transportation, such as airplanes, may sometimes include screens or other entertainment devices built into chairs to allow a passenger to select media or entertainment during their trip. However, the selection of media is often poor or outdated, does not allow a passenger to select his or her preferred media, or to bring his or her own media for viewing or listening. Furthermore, the use of built-in media players, when available, may also contribute to additional touch points which may be vectors for the spread of disease or illnesses.

SUMMARY OF THE INVENTION

An aspect of an embodiment of the present invention provides a device holder for securing a phone, tablet, laptop computer, or other electronic device to a seat back so that a passenger may attach his or her own electronic device for viewing or otherwise consuming the media or entertainment of his or her choice. The device holder is adjustable to fit a wide range of devices and seat types and may include one or more attachments to facilitate its use in different travel environments or situations. When in use, the device holder may hold the passenger's electronic device in a comfortable viewing position without the need for a user to hold the device or taking up space on a tray table. The device holder may also include anti-microbial coatings or be made of materials that may be easily cleaned in a dishwasher or other home appliance.

DESCRIPTION OF THE DRAWINGS

The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

FIGS. 6A-6C provide schematic illustrations of an embodiment of an electronic mounting device including a mounting bracket and a complimentary case.

DETAILED DESCRIPTION OF EXEMPLARY EMBODIMENTS OF THE INVENTION

Figure 2:
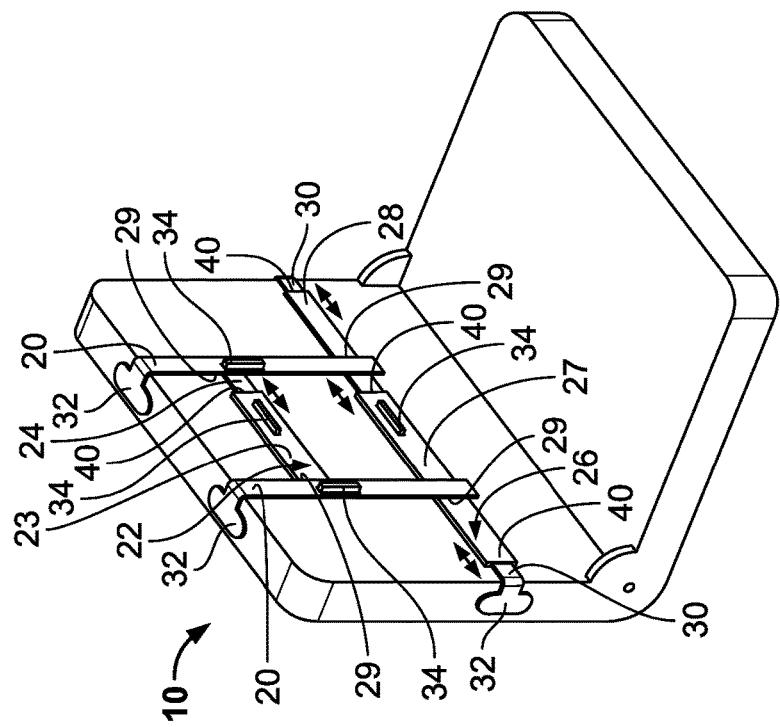
FIG. 2 provides a perspective illustration of an embodiment of an electronic mounting device.
Figure 1:
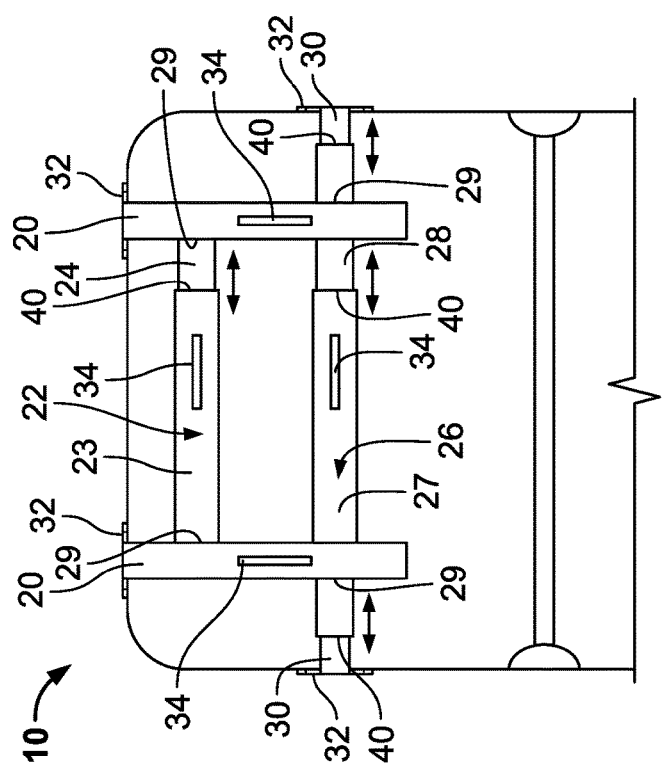
FIG. 1 provides a schematic illustration of an embodiment of an electronic mounting device.

FIGS. 1-2, and 5-9 provide depictions of embodiments of a universal electronic mounting device 10 for mounting personal electronic devices (not shown) to a seatback. The electronic mounting device 10 may include one or more vertical spars 20 in communication with an upper crossmember 22 and a lower crossmember 26 through one or more joints 29, not viewable in the instant views, to create a frame. The upper crossmember 22 may be comprised of an upper crossmember base arm 23 and an upper crossmember extension arm 24 slidably connected through a telescopic joint 40. Similarly, the lower crossmember 26 may be comprised of a lower crossmember base arm 27 and a lower crossmember extension arm 28 slidably connected through a telescopic joint 40. It should be appreciated that in certain embodiments, the upper crossmember 22, lower crossmember 26, or both may be solid pieces without telescopic joints 40. Similarly, the vertical spars 20 may include telescopic joints or otherwise be made of a combination of smaller constituent parts.

The joints 29 moveably connect the vertical spars 20 to the upper crossmember 22 through the upper crossmember base arm 23 and upper crossmember extension arm 24 and to the lower crossmember 26 through the lower crossmember base arm 27 and lower crossmember extension arm 28. In certain embodiments, the joints 29 may allow for the relative translation, rotation, or both, of the vertical spars 20 to the upper crossmember 22 and lower crossmember 26. These joints 29 may be pin and groove joints, tongue and groove joints, or any type of joint that allows for the vertical spars 20 to translate or rotate relative to the upper crossmember base arm 23, upper crossmember extension arm 24, lower crossmember base arm 27, lower crossmember extension arm 28, or any combination thereof. It should be appreciated that the joints 29 may also incorporate one or more mechanisms to alternately lock and release joints 29 to allow for relative movement between the vertical spars 20 and the upper crossmember 22, lower crossmember 26, or their constituent components. For example, the joints 29 may include a ratcheting mechanism, detents, threaded fasteners, cam locks, friction fittings, knobs, or any other mechanism that allows for the joints 29 to allow relative movement for positioning the electronic device mount 10 and then lock into place to maintain the positions of the vertical spars 20, upper crossmember 22, lower crossmember 26, holding elements 34, gripping elements 32, or any combination thereof. Similarly, one or more of telescopic joints 40 may include mechanisms to secure the telescopic joints 40 in place or to resist movement to secure the position of the vertical spars 20, upper crossmember 22, lower crossmember 26, holding elements 34, or gripping elements 32. For example, the telescopic joints 40 may include a ratcheting mechanism, detents, threaded fasteners, cam locks, friction fittings, knobs, or any other mechanism that allows telescopic joints 40 to allow for relative movement for positioning electronic device mount 10 and locking into place to maintain the positions of the vertical spars 20, upper crossmember 22, lower crossmember 26, holding elements 34, gripping elements 32, or any combination thereof. In certain embodiments, one or more of the telescopic joints 40 may allow for relative movement of the gripping elements 32 closer to one another and resist movement of the gripping elements 32 away from one another as with a ratchet or other one-way motion limited joint. A user may then disengage the ratcheting or one-way motion limited joint 40 to expand the distance between the gripping elements 32 to be wider than a seatback, then engage the ratcheting or one way motion limited joint 40 to close the gripping elements 32 onto the seatback and secure the electronic mounting device 10 to the seatback such that the gripping elements 32 may only be tightened to the seatback unless the ratcheting or one-way joint 40 is disengaged or released. In certain embodiments, the joints 29 between the vertical spars 20, upper crossmember 22, and lower crossmember 26 may allow for rotation of the vertical spars 20, upper crossmember 22, and lower crossmember 26 about the joints 29. In such an embodiment, a user may take the electronic mounting device 10 and apply a force at one of the joints 29 or at diagonally opposed joints 29 to fold the electronic mounting device 10 and collapse it such that one joint 29 is moved towards a diagonal joint 29. The electronic mounting device 10 will then fold into a long, slender configuration that is adapted for ease of storage or transport. Similarly, the telescopic joints 40 and joints 29 may allow a user to collapse and fold the electronic mounting device 10 into a more compact shape to fit into luggage or other storage spaces when the electronic mounting device 10 is not in use.

The electronic mounting device 10 may incorporate one or more holding elements 34, herein illustrated as clips 34, for securing a personal electronic device such as a phone or tablet to the electronic mounting device 10. The clips 34 may be attached, affixed, molded into, or otherwise in communication with one or more of the vertical spars 20, upper crossmember 22, lower crossmember 26, or any combination thereof. It should be appreciated that holding elements 34 may be clips, tabs, or any other projection that may secure, hold, or otherwise engage a personal electronic device or its casing. The electronic mounting device 10 may also incorporate one or more gripping elements 32, herein illustrated as feet 32, to secure the electronic mounting device 10 to a seatback. Gripping elements 32 may take on any shape or form as desired or required for a particular application. For example, gripping elements 32 may be oval, circular, square, triangular, or any other shape necessary. Similarly, gripping elements 32 may be feet, hooks, pads, or any other mechanism designed to grip, secure, or otherwise affix to a seatback or feature of a seatback. In certain embodiments, the gripping elements 32 may be rigidly attached to or molded as part of a component of the frame of the electronic mounting device 10. For example, as shown, the gripping elements 32 may be part of the vertical spars 20 for attachment to the top or upper surface of the seatback. However, the gripping elements 32 may also be moveably attached to elements of the frame of the electronic mounting device 10. For example, the gripping element 32 may be in slidable communication with the lower crossmember base arm 27 or lower crossmember extension arm 28, or both, through an attachment arm 30 at a telescopic joint 40. The use of a telescopic joint 40 between the attachment arm 30 of a gripping element 32 and the lower crossmember base arm 27 or lower crossmember extension arm 28 may allow for additional flexibility or degrees of freedom when locating the electronic mounting device 10 to a seatback in that a user may adjust the distance between the vertical spars 20 and the upper crossmember 22 and the lower crossmember 26 to accommodate a wide range of shapes and sizes of personal electronic devices. Similarly, the use of telescopic joints 40 and joints 29 to moveably connect the vertical spars 20 to the upper crossmember 22 and lower crossmember 26, or any of their constituent parts, allows the position and reach of the griping elements 32 to be adjusted to fit a wide variety of seatbacks. Furthermore, the use of a telescopic joint 40 between the upper crossmember base arm 23 and upper crossmember extension arm 24 and use of another telescopic joint 40 between the lower crossmember base arm 27 and lower crossmember extension arm 28 allow the distance between the vertical spars 20 to be adjusted independently from the total distance between the gripping elements 32 on the attachment arms 30 that are in slidable communication with the lower crossmember base arm 27 and the lower crossmember extension arm 28. The electronic mounting device 10 may then adjust the width between the holding elements 34 and the grip elements 32 independently to allow a user to fit both an electronic device and a seatback independently. Similarly, the joints 29 between the upper crossmember 22, or its constituent components and the vertical spars 20 and joints 29 between the lower crossmember 26, or its constituent components, and vertical spars 20 allow the upper crossmember 22 and lower crossmember 26 to be moved vertically relative to one another along the vertical spars 20. A user may then affix or otherwise attach the gripping elements 32 at the upper ends of the vertical spars 20 to a seatback and position the upper crossmember 22 and lower crossmember 26 to allow for the holding elements 34 on the upper crossmember 22 and lower crossmember 26 to engage the upper and lower edges of a personal electronic device, while also adjusting the overall viewing height of the personal electronic device.

Still referring to FIGS. 1-2 and 5-9, the electronic mounting device 10 may take on a number of variations or configurations as desired or required for any particular application. For example, in certain embodiments, the vertical spars 20 may include one or more telescoping joints 40 along their length to increase the degrees of freedom of the positioning of the upper crossmember 22, lower crossmember 26, or both. Furthermore, the gripping elements 32 at the upper ends of the vertical spars 20 may be in slidable communication with the vertical spars 20 through a telescopic joint 40. In still further exemplary embodiments, the electronic mounting device 10 may include joints 29 which allow for translation, rotation, or both, between the vertical spars 20 and the upper crossmember 22, lower crossmember 26, or both. It should be appreciated that the electronic mounting device 10 may be configured such that the upper crossmember 22 is in communication with one or more gripping elements 32 in place of, or in addition to, gripping elements 32 in communication with the lower crossmember 26. The electronic mounting device 10 may also have any number of gripping elements 32 and holding elements 34. For example, the electronic mounting device 10 may include gripping elements 32 in communication the upper ends of the vertical spars 20, in communication with the upper crossmember 22, in communication with the lower crossmember 26, or any combination thereof. Furthermore, the electronic mounting device 10 may include one, two, three, four, or more holding elements 34 disposed in any arrangement or location along the vertical spars 20, upper crossmember 22, lower crossmember 26, or any combination thereof. In certain embodiments, one or more holding elements 34 may be spring loaded, hooked, or otherwise shaped to allow for a single point grip onto a personal electronic device.

Figure 5:
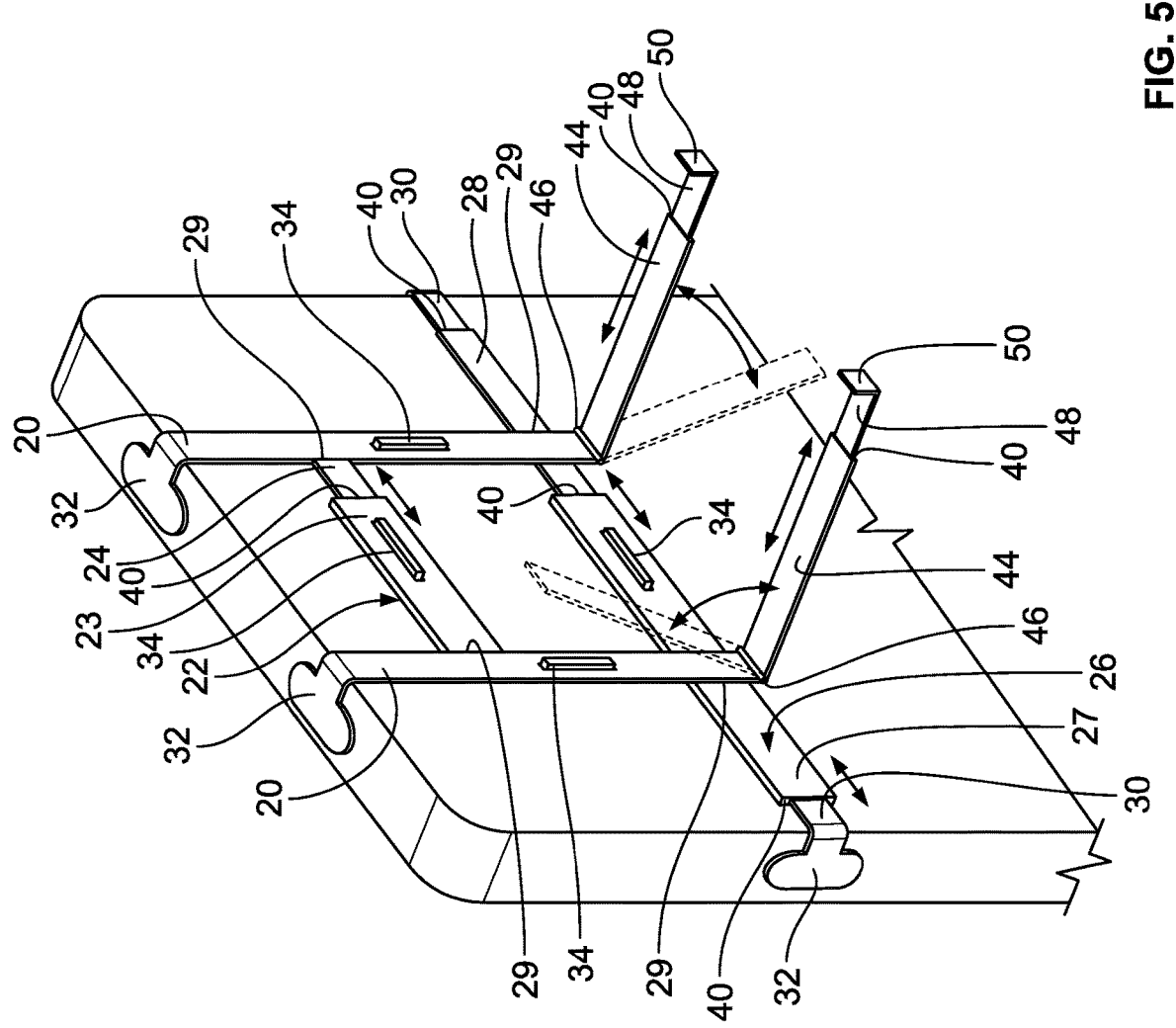
FIG. 5 provides a perspective illustration of an embodiment of an electronic mounting device including cradle arms.

Referring to FIG. 5, the electronic mounting device 10 may also include one or more cradle arms 44 rotatably affixed or attached to a lower end of the vertical spars 20 through a hinge 46. The cradle arms 44 may also include a cradle extension 48 with a tab 50 in slidable communication with the cradle arms 44 through a telescopic joint 40. During use, a user may extend the cradle arms 44 from a stowed position, which may be upwards toward the vertical spars 20 or sideways towards the lower crossmember 26, and then place a personal electronic device in the cradle arms 44 to support it during use. The user may then adjust the cradle extensions 48 via telescoping joints 40 to engage the tabs 50 with the personal electronic device. The cradle arms 44 of the electronic mounting device 10 may be used to hold an accessory keyboard for a tablet or other electronic device, or to provide support for the lower portions of a laptop or other similar personal electronic devices. It should be appreciated that the hinges 46 and optional telescopic joints 40 may include one or more mechanisms to limit the motion of the hinges 46 and telescopic joints 40 of the cradle extensions 48 such that a user may selectively position the cradle arms 44 and cradle extensions 48 into a particular position. For example, the hinges 46 or telescopic joints 40 may include a ratcheting mechanism, detents, threaded fasteners, cam locks, friction fittings, knobs, or any other mechanism that allows for the hinges 46 or telescopic joints 40 to allow relative movement for positioning the cradle arms 44 and cradle extensions 48 and then lock the cradle arms 44 and cradle extensions 48 into place to maintain their positions. In certain embodiments, the telescopic joints 40 may include a ratchet or one way mechanism that allows a user to close or shorten the cradle extensions 44 to engage the tabs 50 with an electronic device but to prevent the unintended extension or loosening of the cradle extensions 44 in use. Furthermore, it should be appreciated that the hinges 46 may allow the cradle arms 44 to rotate to any angle between the cradle arms 44 and the vertical spars 20, including angles greater than ninety degrees.

Referring to FIGS. 6A-6C, the holding element may comprise a mounting bracket 64 adapted for use with an attachment fitting 62, which may be fitted to a case 60 or fitted directly to a personal electronic device such as a phone or tablet. The case 60 may take on any shape, size, or configuration as desired or required to fit a particular personal electronic item available on the market and may provide a mounting point for the attachment fitting 62. The attachment fitting 62, which may be complementary or otherwise configured to engage with the mounting bracket 64, may then be used to affix or otherwise attach the case 60 or personal electronic device to the electronic mounting device 10. The mounting bracket 64 provides a releasable attachment for the attachment fitting 62 to be engaged and disengaged by a user. The attachment fitting 62 may comprise a spring-loaded coupling, interference fit, snap fit, or any other type of releasable attachment that may engage the attachment fitting 62 with the mounting bracket 64. It should be appreciated that in certain embodiments, the attachment fitting 62 may allow for rotation of the personal electronic device or case 60 relative to the mounting bracket 64.

Figure 8:
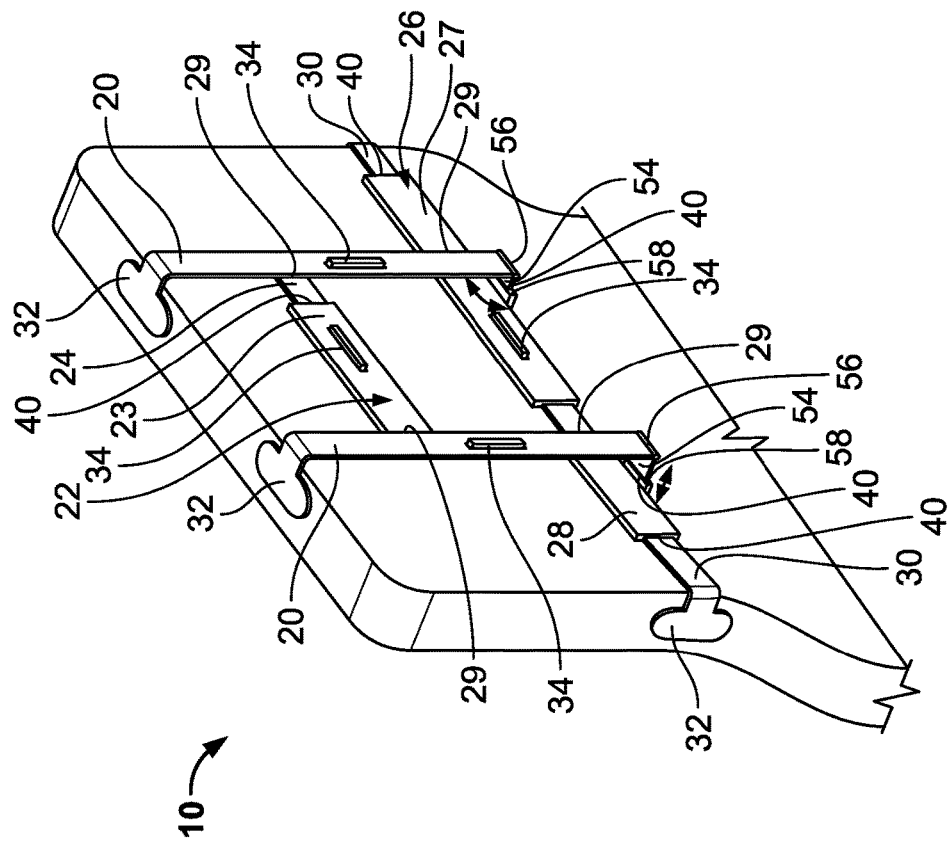
FIGS. 7 and 8 provide schematic illustrations of an embodiment of an electronic mounting device including support brackets.
Figure 7:
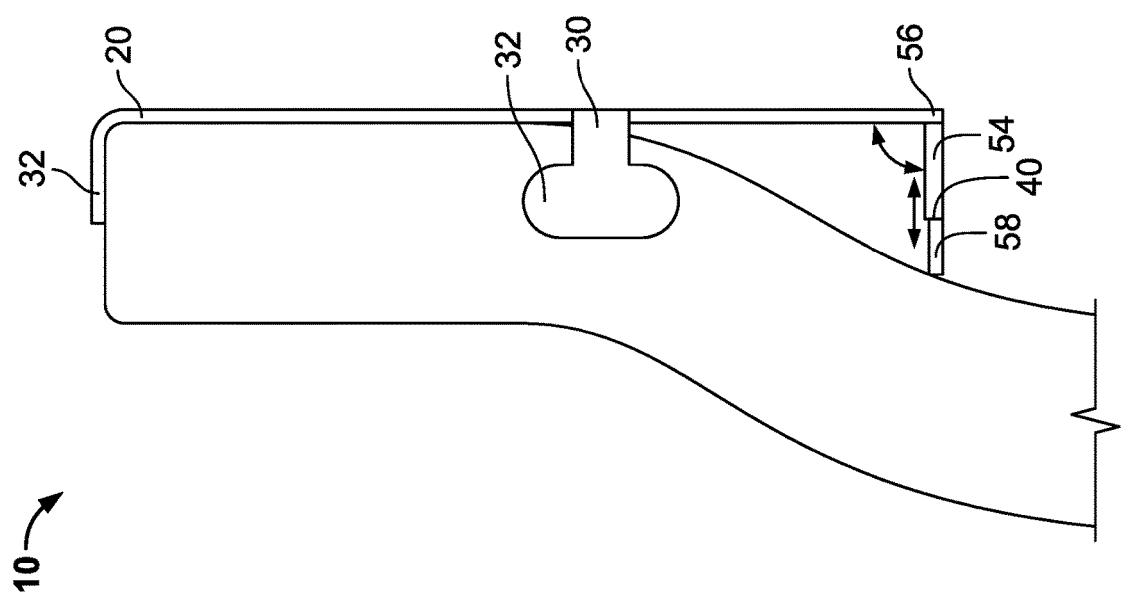

Referring to FIGS. 7 and 8, the electronic mounting device 10 may also comprise one or more support brackets 54 which may be rotatably affixed to the vertical spars 20 through a hinge 56. The support brackets 54 may also optionally include an extension 58 in slidable communication with the support bracket 54 through telescoping joint 40. As shown, the support brackets 54 may rotate down from a vertical stowed position behind the vertical spars 20 and extend extensions 58 to engage a seatback that may be curved or otherwise not planar. The support brackets 54 may then help support the weight of the electronic mounting device 10 and any personal electronics engaged therewith. In certain embodiments, the support bracket 54 may be retained in a vertical stowed position by a tab, snap, or other securing means, and the hinge 56 may limit motion to a specified angle of extension from the vertical stowed position. In still other exemplary embodiments, the support bracket 54 may be locked into any angular position via a locking mechanism that may include a ratcheting mechanism, detents, threaded fasteners, cam locks, friction fittings, knobs, or any other mechanism that allows for the hinge 56 to allow relative movement for positioning the support bracket 54 and then lock into place to maintain that position. The support bracket 54 may then also function as a prop, leg, or stand to allow a user to use the electronic mounting device 10 as a stand to hold a smart phone, tablet, laptop computer, or other personal electronic device up on a table, counter, floor, or other surface. In certain embodiments, the support brackets 54 may be used in conjunction with the cradle arms 44 as shown in FIG. 5 to support the electronic mounting device 10 on a surface.

Figure 9:
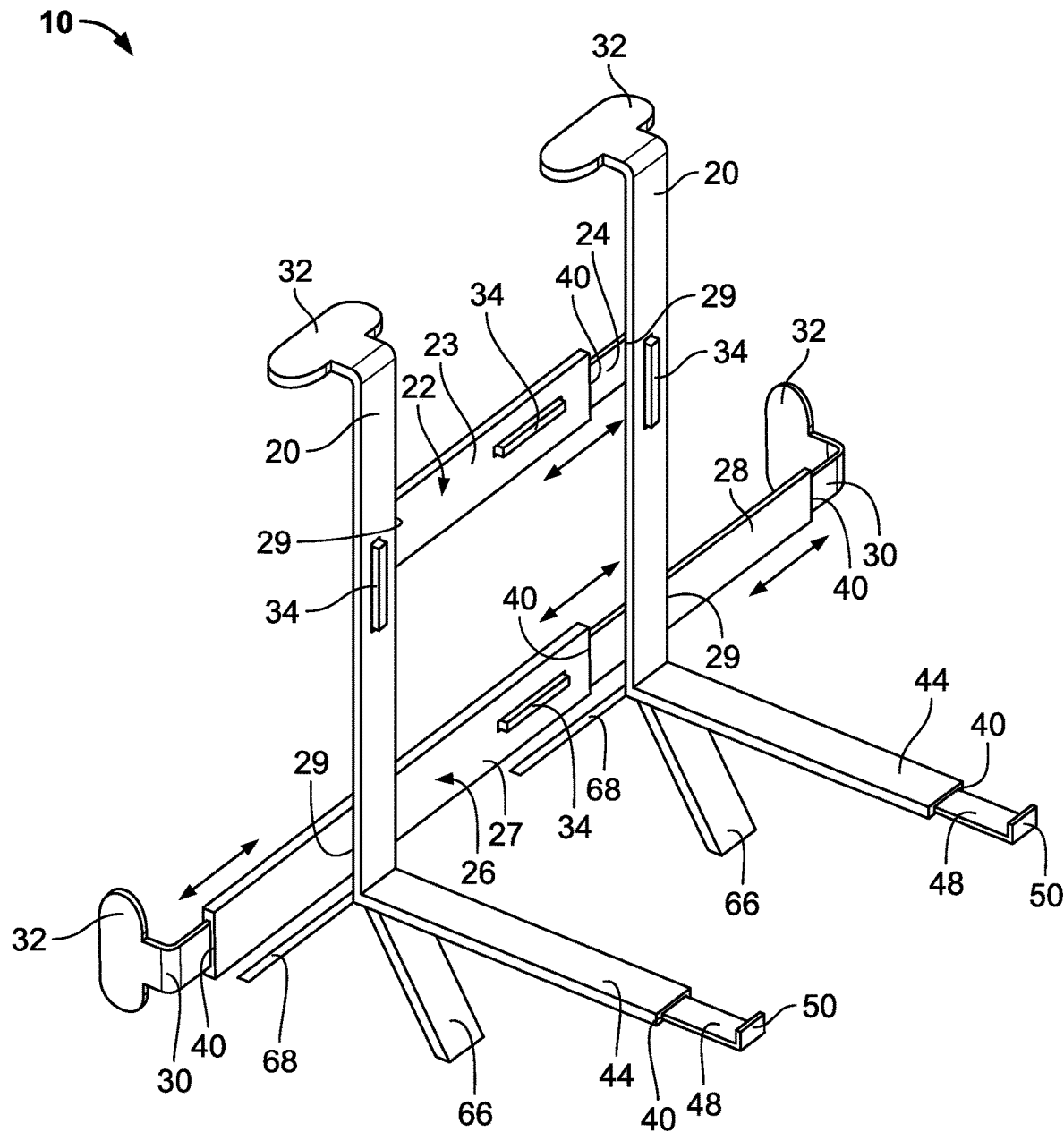
FIG. 9 provides a perspective illustration of an embodiment of an electronic mounting device including front and rear legs.

Referring to FIG. 9, the electronic mounting device 10 may further comprise cradle extensions 48 with tabs 50 in slidable communication with cradle arms 44 via telescoping joint 40, front legs 66 and rear legs 68. Front legs 66 and rear legs 68 may be rotatably affixed or otherwise moveably attached to the lower end of the vertical spars 20. The front legs 66 and rear legs 68 may rotate into a deployed position wherein the front legs 66 and rear legs 68 may support the electronic mounting device 10 on a table, counter, user's lap, or other surface. It should be appreciated that the front legs 66 or rear legs 68 may be affixed or otherwise attached to the electronic mounting device 10 via a locking mechanism that may include a ratcheting mechanism, detents, threaded fasteners, cam locks, friction fittings, knobs, or any other mechanism that allows for the front legs 66 or rear legs 68 to be positioned relative to the electronic device mount 10 and then lock into place to maintain their positions. It should be appreciated that in certain embodiments, front legs 66 or rear legs 68 may also incorporate telescopic joints to allow for resting the electronic mounting device 10 on uneven surfaces. In certain embodiments, the front legs 66 or rear legs 68 may be retained in a stowed position by a snap, tab, or other securing means, and the front legs 66 or rear legs 68 may be held in a stowed position to the vertical spars 20, cradle arms 44, support brackets 54, or any combination thereof.

Figure 3B:
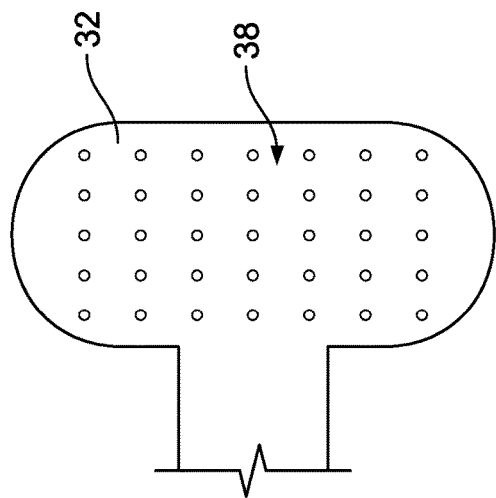
FIGS. 3A-3C provide schematic illustrations of various embodiments of a gripping member as a foot.
Figure 3C:
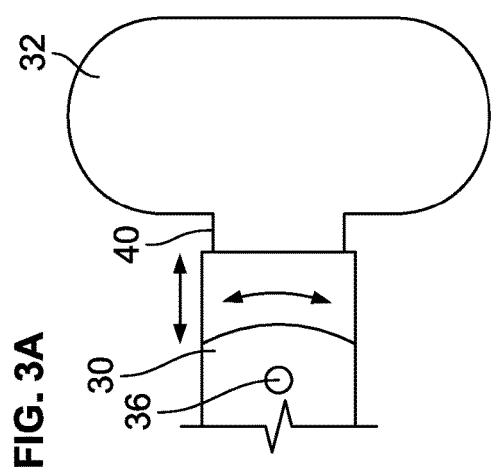
Figure 3A:
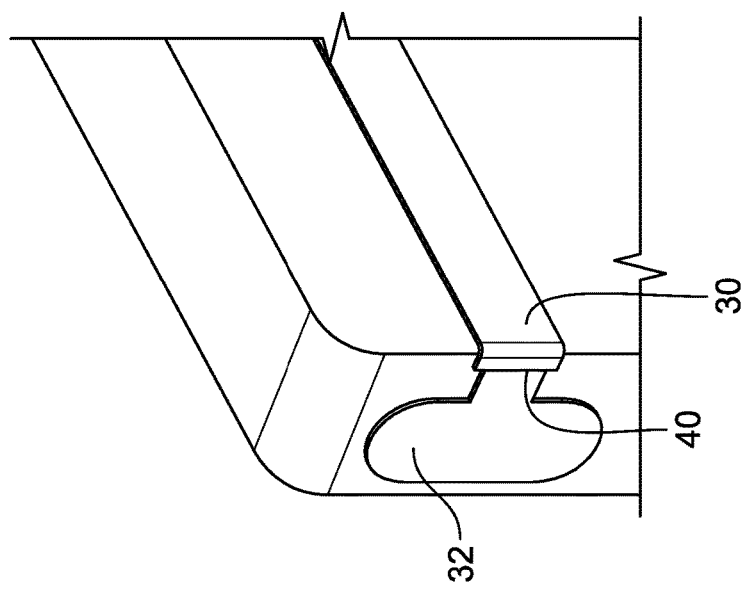

FIGS. 3A-3C provide schematic depictions of embodiments of a gripping member as a foot 32. As shown in FIG. 3A, the foot 32 may be in slidable communication with an attachment arm 30 through a telescopic joint 40. The telescopic joint 40 allows the foot 32 to extend or retract to accommodate seats of varying thickness during the mounting of the electronic mounting device. As shown in FIG. 3B, the foot 32 may also include a gripping surface 38 to enhance the friction or grip between the foot 32 and the seatback. The gripping surface 38 may comprise a textured surface with cones, pyramids, grooves, tread, or other geometric features for enhancing the friction between the foot 32 and the seatback, or a material layer or coating such as rubber, elastomers, polymers, fabrics, composites, or other materials that may increase friction with seatback materials. As shown in FIG. 3C, the foot 32 may engage an attachment arm 30 through a telescopic joint 40 and a pivot 36. The combination of the telescopic joint 40 and pivot 36 allows the foot 32 to extend and retract and rotate relative to the attachment arm 30 to provide additional degrees of freedom for mounting the electronic mounting device to seats of varying sizes and shapes.

Figure 4A:
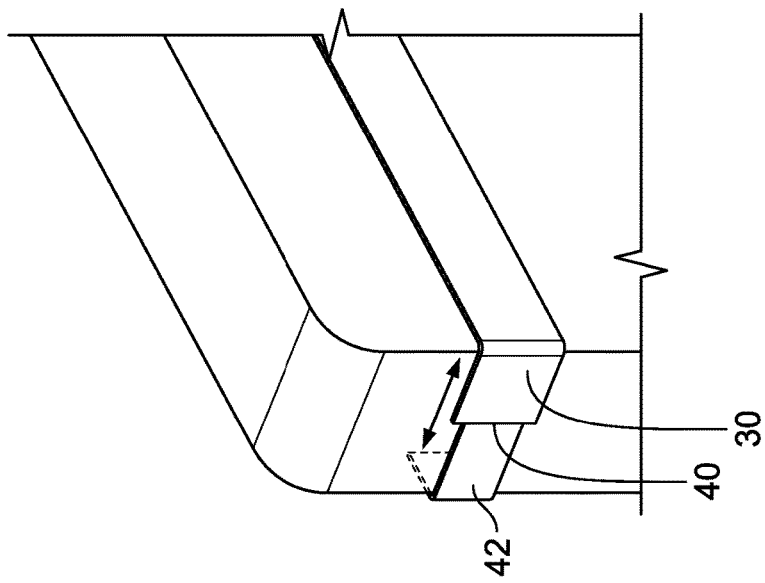
FIGS. 4A-4C provide schematic illustrations of various embodiments of a gripping member as a hook.
Figure 4B:
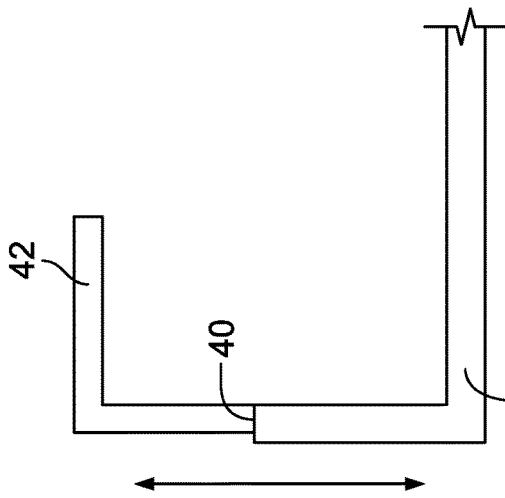
Figure 4C:
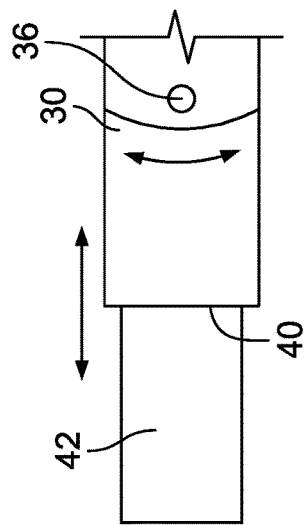

FIGS. 4A-4C provide schematic depictions of embodiments of a gripping member as a hook 42. As shown in FIGS. 4A and 4B, the hook 42 may be in slidable communication with an attachment arm 30 through a telescopic joint 40. The telescopic joint 40 allows the hook 42 to extend or retract to accommodate seats of varying thickness during the mounting of the electronic mounting device. The hook 42 may also comprise a textured surface with cones, pyramids, grooves, tread, or other geometric features for enhancing the friction between the hook 42 and the seatback, or a material layer or coating such as rubber, elastomers, polymers, fabrics, composites, or other materials that may increase friction with seatback materials. As shown in FIG. 4C, the hook 42 may engage an attachment arm 30 through a telescopic joint 40 and a pivot 36. The combination of the telescopic joint 40 and pivot 36 allows the hook 42 to extend and retract and rotate relative to the attachment arm 30 to provide additional degrees of freedom for mounting the electronic mounting device to seats of varying sizes and shapes.

FIGS. 10-16 provide schematic depictions of an electronic mounting device 100 comprising one or more vertical spars 102 in communication with an upper crossmember 104, a lower crossmember 110, and a first intermediate crossmember 106 to form a frame. The upper crossmember 104 may be rotatably affixed or attached to the upper ends of the vertical spars 102 and in communication with one or more seat mounting hooks 114. The seat mounting hooks 114 may rotate from a stowed position into a deployed position wherein the seat mounting hooks 114 may engage with a seatback, headrest, or headrest supports. In order to adjust the seat mounting hooks 114, a user may release adjustment knobs 112 on the upper crossmember 104 to release the seat mounting hooks 114 from their stowed position, rotate them into a deployed position, and secure the adjustment knobs 112 on the upper crossmember 104 to hold the seat mounting hooks 114 in the deployed position. A device support tray 118 may be rotatably affixed to the intermediate crossmember 106, which in turn may be slidably affixed to the vertical spars 102. One or more adjustment knobs 112 in communication with the intermediate crossmember 106 and the device support tray 118. A user may release the adjustment knobs 112 of the intermediate crossmember 106 and device support tray 118 to allow the device support tray 118 to rotate relative to the intermediate crossmember 106 and to allow the intermediate crossmember 106 to translate, slide, or otherwise move along the vertical spars 102. The user may then position the device support tray 118 and the intermediate crossmember 106 at a comfortable height and angle for use of an electronic device supported by the device support tray 118.

The device support tray 118 may comprise a back support 120 that may be rotatably affixed to the device support tray 118 to allow the back support 120 to be stowed flush with the surface of the device support tray 118, but also to deploy into an upright position for supporting a smart phone, tablet, or other personal electronic device. The device support tray may also feature one or more locating grooves 122 adapted to accept a personal electronic device such as a smart phone or tablet. The locating grooves 122 provide an anchor point for securing the bottom edge of a personal electronic device to the device support tray 118 and to prevent the personal electronic device from slipping or shifting during use. It should be appreciated that the locating grooves 122 may be used in conjunction with the back support 120 to support and position the user's personal electronic device.

Figure 10:
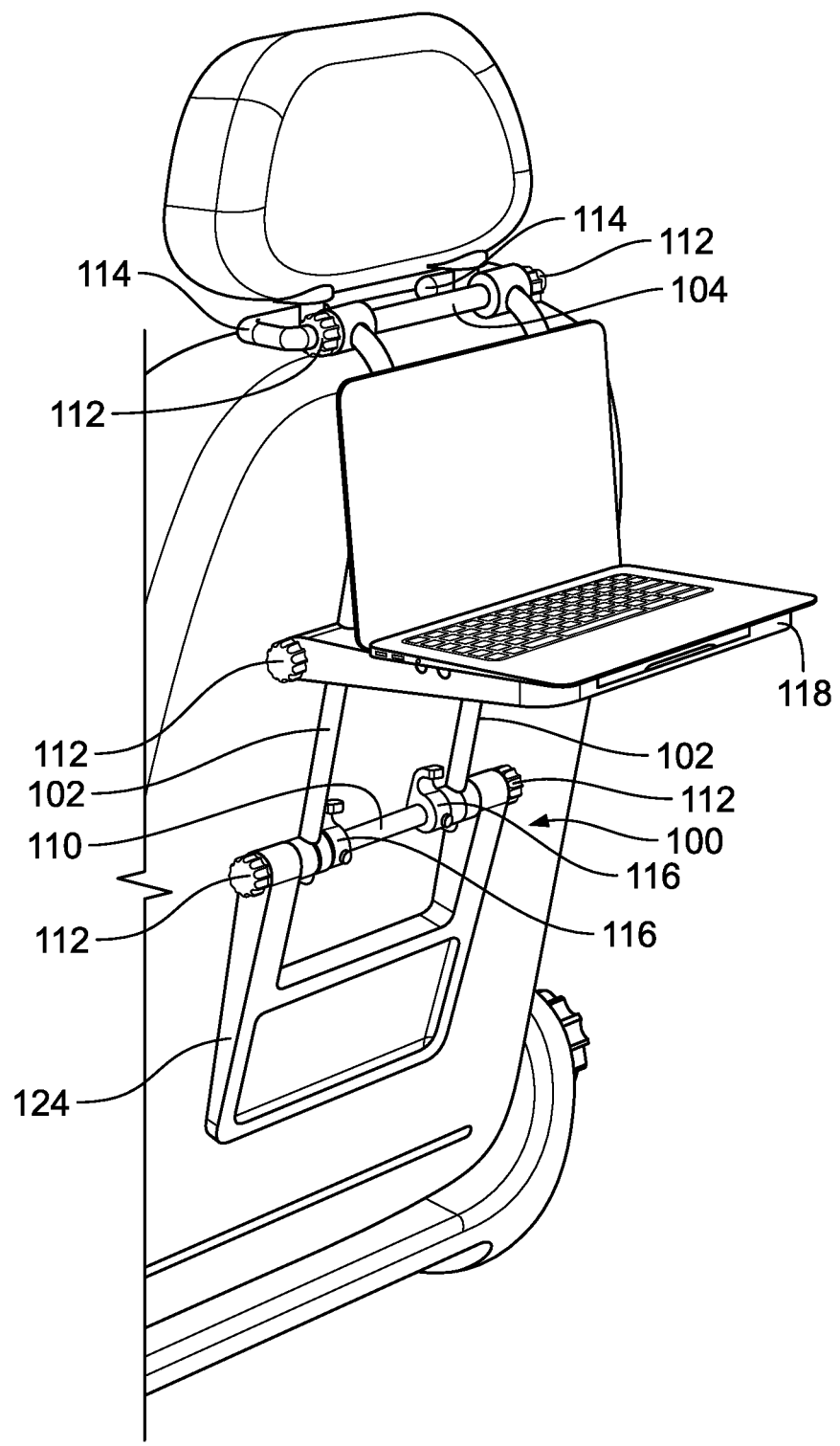
FIG. 10 provides a perspective illustration of an embodiment of an electronic mounting device including a device support tray.
Figure 11:
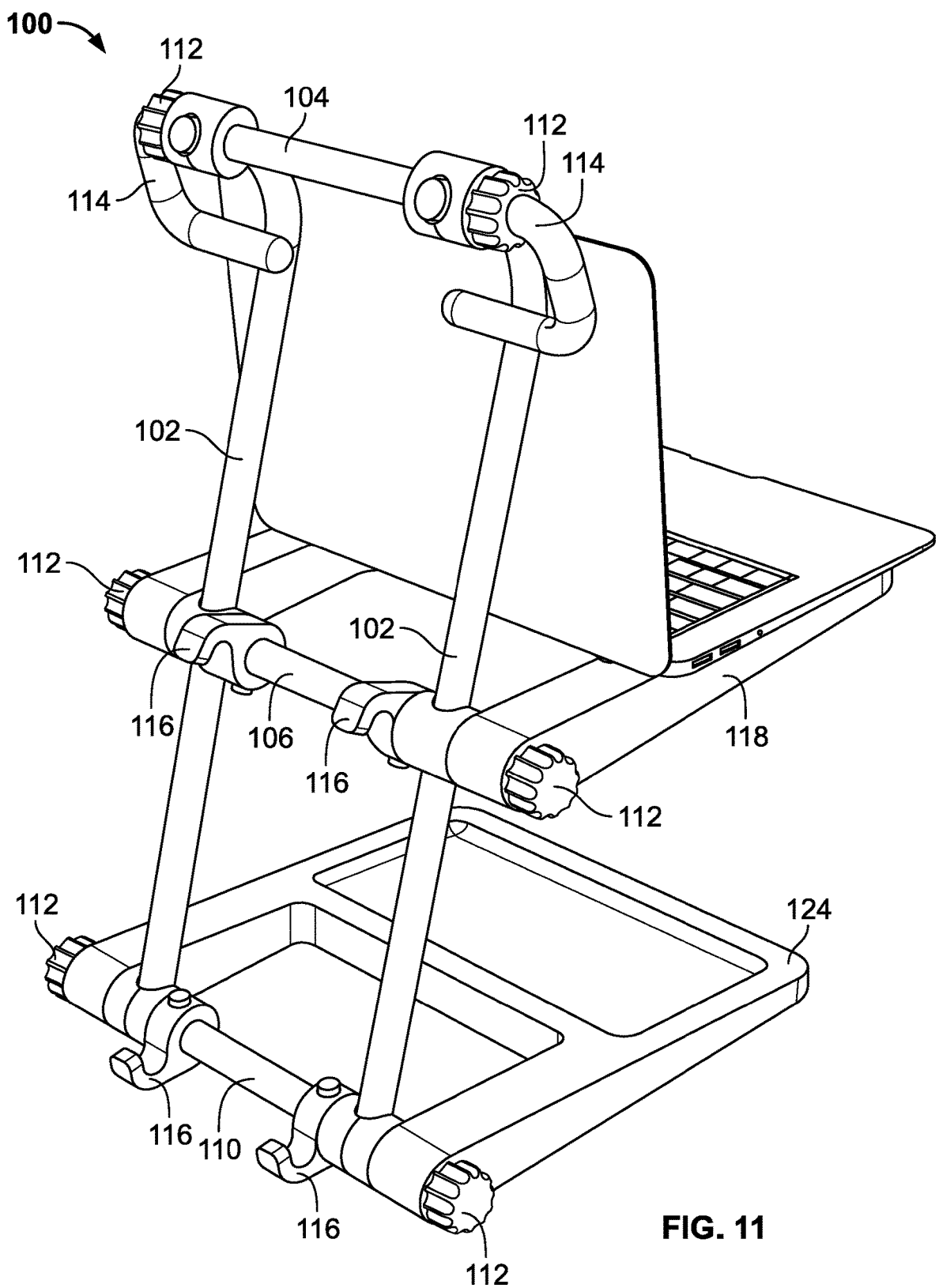
FIGS. 11-13 provide perspective illustrations of an embodiment of an electronic mounting device including a support tray.
Figure 12:
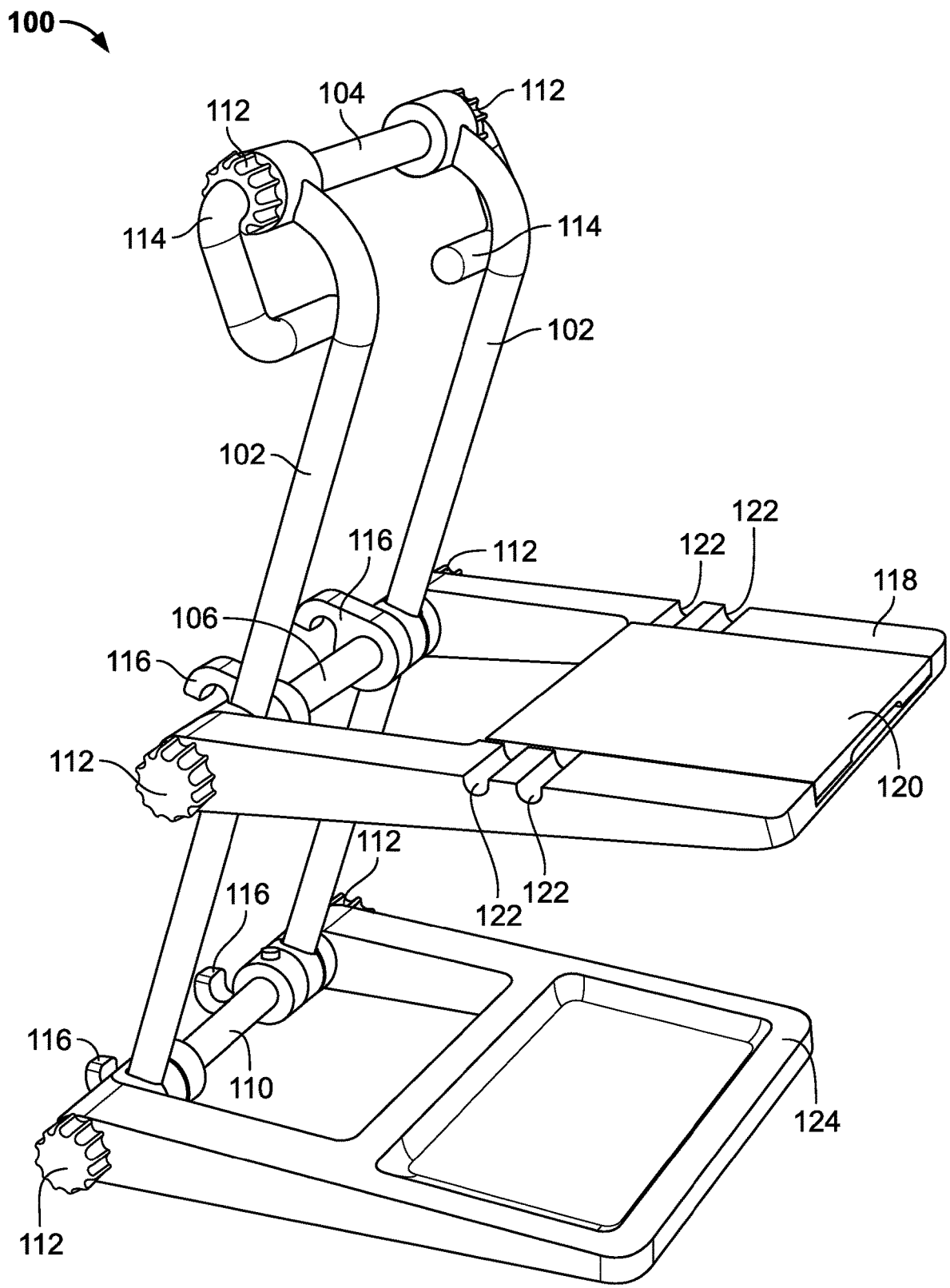
Figure 13:
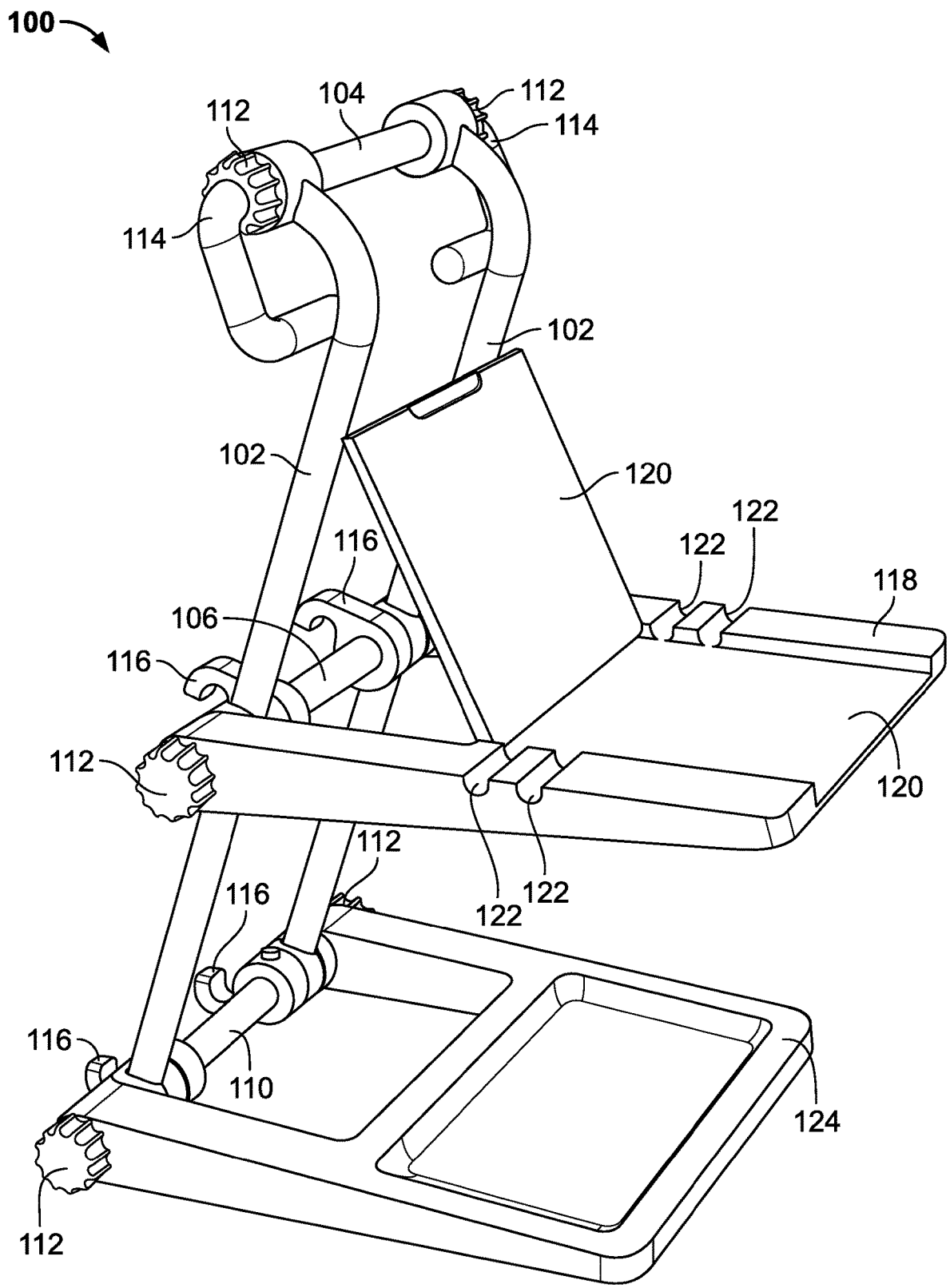
Figure 14:
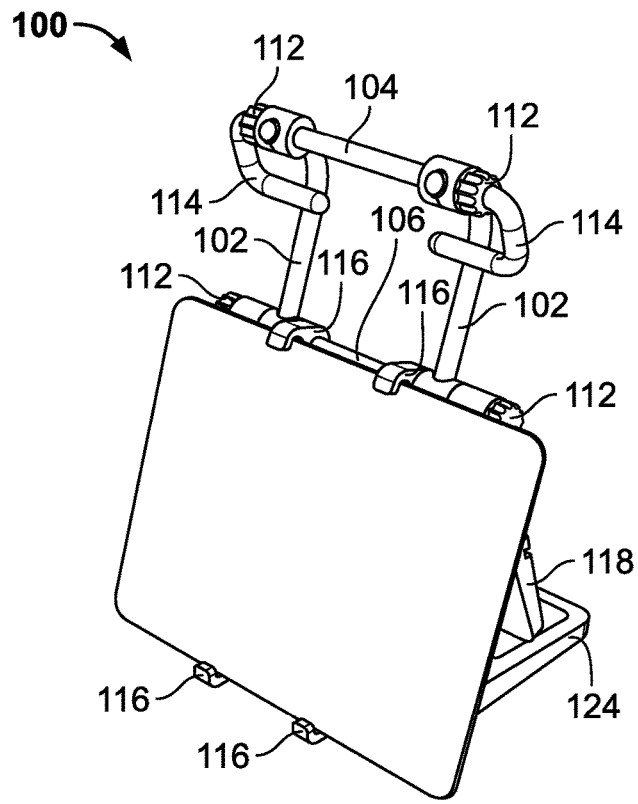
FIGS. 14 and 15 provide perspective illustrations of an embodiment of an electronic mounting device securing a tablet device.
Figure 15:
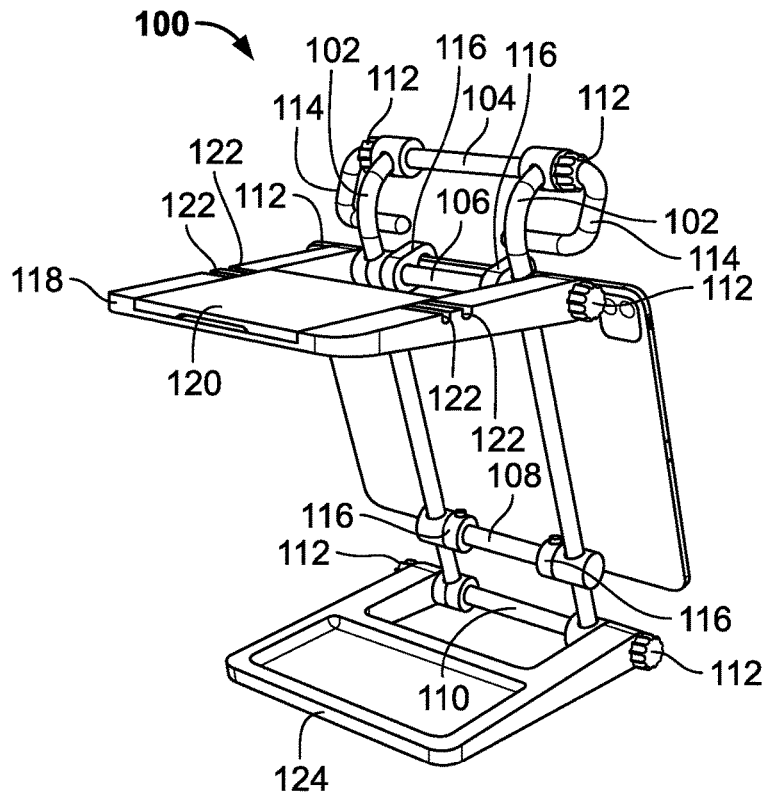
Figure 16:
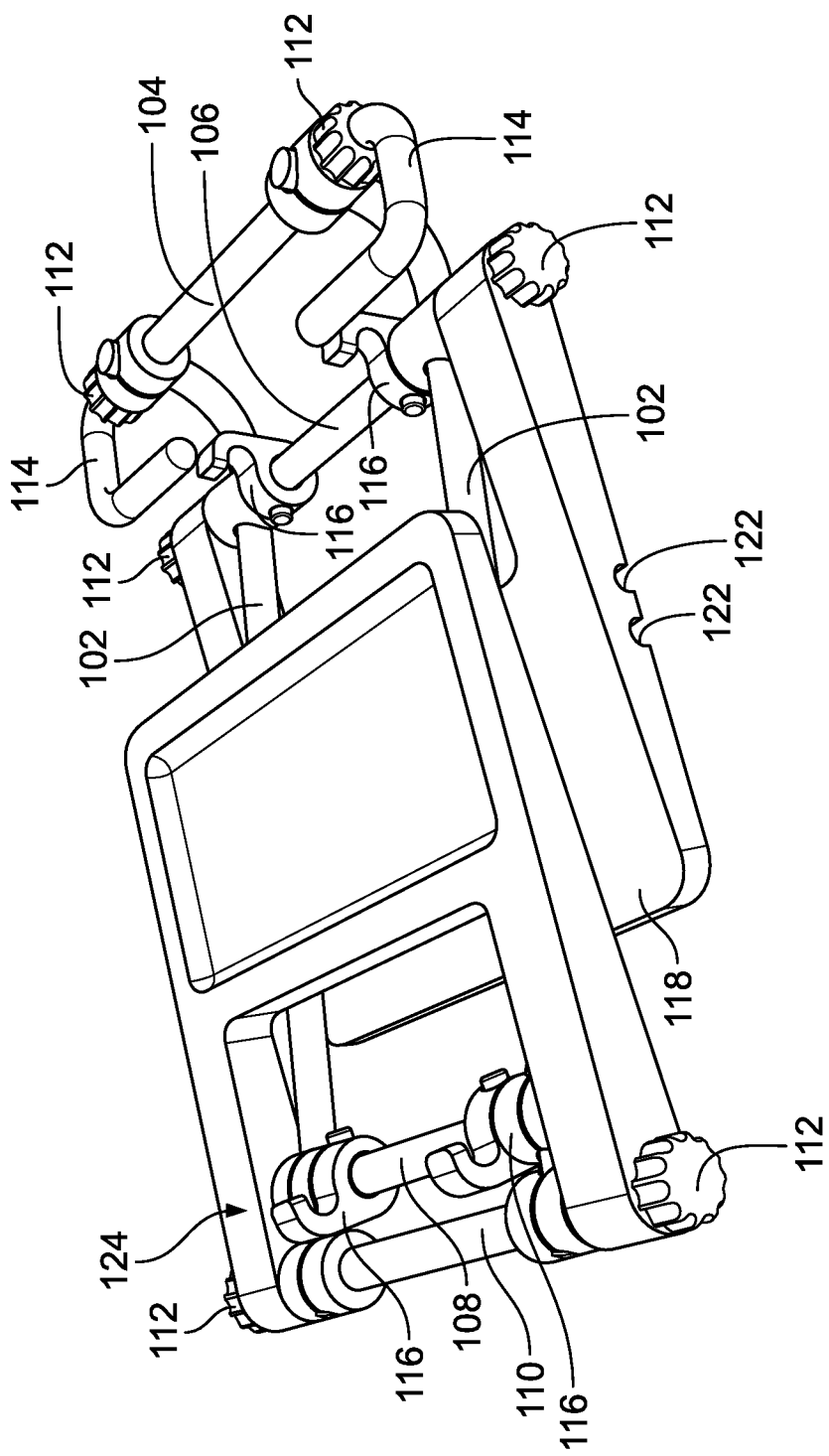
FIG. 16 provides a perspective illustration of an embodiment of an electronic mounting device in a folded configuration.

Still referring to FIGS. 10-16, the electronic mounting device 100 may also include a base tray 124 rotatably affixed to the lower crossmember 110. The base tray 124 is secured in position to the lower crossmember 110 and relative to the vertical spars 102 via one or more adjustment knobs 112 in communication with the base tray 124 and lower crossmember 110. A user may release the adjustment knobs 112 to allow the base tray 124 to pivot or rotate about lower crossmember 110. A user may then position the base tray 124 as a secondary surface for use, as seen in FIGS. 11-15, wherein the base tray may be another working or useable surface while the electronic mounting device 100 is mounted to a seatback, or as a base for freestanding use. A user may also position the base tray 124 to retract the base tray 124 to provide extra knee room during use, as shown in FIG. 10, or to stow the base tray 124 when the electronic mounting device 100 is folded or otherwise collapsed into a smaller size for transport or storage as seen in FIG. 16. It should be appreciated that in certain embodiments, the lower crossmember 110 may also slide or otherwise translate along the vertical spars 102 to allow a user to position the height of the base tray 124. The user may then secure the base tray 124 and lower crossmember 110 into position by securing the adjustment knobs 112.

In certain embodiments, the electronic mounting device 100 may include one or more device hooks 116 for securing a tablet, smart phone, or other personal electronic device to the electronic mounting device 100. The device hooks 116 may be rotatably affixed to the intermediate crossmember 106, lower crossmember 110, or both. The device hooks 116 may include a locking mechanism, which may comprise a ratcheting mechanism, detents, threaded fasteners, cam locks, friction fittings, knobs, or any other mechanism that allows for the device hooks 116 to rotate about the intermediate crossmember 106 or lower crossmember 110 and lock into a deployed position. A user may then adjust the vertical positioning of the intermediate crossmember 106, lower crossmember 110, or both to secure a personal electronic device within the device hooks 116. As shown in FIGS. 14 and 15, the device hooks 116 may be of particular use when holding flat or relatively planar personal electronic devices such as phones or tablets when the electronic mounting device 100 is used in a freestanding manner. It should be appreciated that the adjustment knobs 112 may be any type of device, coupling, or mechanism that allows a user to selectively lock or unlock parts of the electronic mounting device 100 to allow for relative movement between those parts and then to secure those parts into a fixed position. Furthermore, the adjustment knobs 112 may comprise a ratcheting mechanism, detents, threaded fasteners, cam locks, friction fittings, knobs, or any other mechanism that facilitates this function.

Referring to FIGS. 15 and 16, the electronic mounting device 100 may also include a second intermediate crossmember 108, which may carry one or more of the device hooks 116 and may translate, slide, or otherwise move along the vertical spars 102. The second intermediate crossmember 108 allows a user an extra degree of freedom when positioning the electronic mounting device 100, the device hooks 116, the device support tray 118, and other components of the electronic mounting device 100. A user may then adjust the position of any device hooks 116 located on the second intermediate crossmember 108 independently of the device support tray 118 on the intermediate crossmember 106 and the base tray 124 on the lower crossmember 110.

Referring to FIGS. 1-16, it should be appreciated that the electronic mounting device 10, 100 may be folded, collapsed, or otherwise arranged into a smaller volume for storage or travel by manipulation of the various joints and elements of the electronic mounting device 10, 100.

Still referring to FIGS. 1-16, it should be appreciated that any components of the electronic mounting device 10, 100 may be manufactured or formed from a multitude of materials that satisfy the working requirements of the invention. This includes, but is not limited to, plastics, polymers, composites, metals, alloys and any combination thereof. This also includes, but is not limited to, materials molded or otherwise formed in order to have changing properties in any fashion including, but not limited to, along their length or across their section. This change in properties may either be by section or continuous in nature. The materials selected for the electronic mounting device 10, 100 may be selected based on ease of manufacturing, price, material properties such as density, strength, modulus of elasticity, electrical or thermal conductivity, and biological compatibility. Furthermore, in certain embodiments, the electronic mounting device 10, 100 may incorporate materials, coatings, or treatments that make the surface antibacterial, antifungal, antiviral, or otherwise hostile to any kind of disease vectors. The electronic mounting device 10, 100 may also incorporate materials that allow for the use of standardized cleaning machines such as a household dishwasher to clean and sanitize the device after use.

The applicant contemplates within the context of this invention that it may be produced in any geometrical form with variable length, width, shape, size, or other dimensional variability to match the requirements of specific applications for use.

It should be appreciated that the electronic mounting device 10, 100 may be manufactured in a variety of ways. Specifically, this includes forming, molding, casting, forging, or otherwise producing components, sub-components, or portions thereof. The device may be produced as an assembly of parts wherein those parts are attached in any manner, including but not limited to fusing, welding, friction fits, threaded connections, snap connections, adhesives, or any other method for connecting one component, sub-component, or any portion thereof to another component, sub-component or portion thereof. The electronic mounting device 10, 100 may also be manufactured so as to combine different functional elements into a single, multi-function component that would take on the function of two otherwise separate components.

It should be appreciated that various sizes, dimensions, contours, rigidity, shapes, flexibility and materials of any of the components or portions of components in the various embodiments discussed throughout may be varied and utilized as desired or required. Similarly, locations and alignments of the various components may vary as desired or required.

It should be appreciated that any of the components or modules referred to with regards to any of the present invention embodiments discussed herein, may be integrally or separately formed with one another. Further, redundant functions or structures of the components or modules may be implemented.

It should be appreciated that the electronic mounting device 10, 100 and related components discussed herein may take on all shapes along the entire continual geometric spectrum of manipulation of x, y and z planes to provide and meet the anatomical and structural demands and operational requirements. Moreover, locations and alignments of the various components may vary as desired or required.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particular interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

I claim:

1. A mounting device for mounting a personal electronic equipment, said mounting device comprising:
   a first vertical spar;
   a second vertical spar;
   an upper crossmember comprising an upper crossmember base arm in telescopic communication with an upper crossmember extension arm;
   a lower crossmember comprising a lower crossmember base arm in telescopic communication with a lower crossmember extension arm;
   a first gripping element in communication with one of said first vertical spar, said second vertical spar, said upper crossmember, or said lower crossmember to engage the seatback;
   a second gripping element in communication with one of said first vertical spar, said second vertical spar, said upper crossmember, or said lower crossmember to engage the seatback;
   a first holding element in communication with one of said first vertical spar, said second vertical spar, said upper crossmember, or said lower crossmember; and
   a second holding element in communication with one of said first vertical spar, said second vertical spar, said upper crossmember, or said lower crossmember, said second holding element disposed opposite of said first holding element, said first holding element and said second holding element configured to secure personal electronic equipment;
   wherein said first vertical spar is moveably affixed to said upper crossmember base arm and said lower crossmember base arm, said second vertical spar is moveably affixed to said upper crossmember extension arm and said lower crossmember extension arm a distance from said first vertical spar to form a frame.

2. The mounting device of claim 1, wherein said first gripping element and said second gripping element comprise a foot.

3. The mounting device of claim 1, wherein said first gripping element and said second gripping element comprise a hook and wherein said hook has a planar or cross section.

4. The mounting device of claim 1, wherein said first gripping element is in communication with an upper end of said first vertical spar and said second gripping element is in communication with an upper end of said second vertical spar.

5. The mounting device of claim 4, further comprising a third gripping element and a fourth gripping element, wherein said third gripping element is in communication with said lower crossmember base arm and said fourth gripping element is in communication with said lower crossmember extension arm.

6. The mounting device of claim 5, wherein said third gripping element comprises an adjustment arm, said adjustment arm of said third gripping element in telescopic communication with said lower crossmember base arm and wherein said fourth gripping element comprises an adjustment arm, said adjustment arm of said fourth gripping element in telescopic communication with said lower crossmember extension arm.

7. The mounting device of claim 1, further comprising a first cradle arm comprising a first cradle extension having a first tab and a second cradle arm comprising a second cradle extension having a second tab, wherein said first cradle arm is in telescopic communication with said first cradle extension and said first tab is configured to engage an electronic device, said first cradle arm in communication with a lower end of said first vertical spar and wherein said second cradle arm is in telescopic communication with said second cradle extension and said second tab is configured to engage an electronic device, said second cradle arm in communication with a lower end of said second vertical spar.

8. The mounting device of claim 1, further comprising a first front leg, a first rear leg, a second front leg, and a second rear leg;
   wherein said first front leg and said first rear leg are in communication with a lower end of said first vertical spar, said second front leg and said second rear leg are in communication with a lower end of said second vertical spar, and wherein said first front leg and said second front leg are disposed downward from said lower end of said first vertical spar and said second front leg and said second rear leg are disposed downward from said lower end of said second vertical spar.

9. A mounting device for personal electronic equipment, said mounting device comprising:
   a first vertical spar having an upper end and a lower end;
   a second vertical spar having an upper end and a lower end;
   an upper crossmember comprising an upper crossmember base arm and an upper crossmember extension arm in communication via a telescopic joint;
   a lower crossmember comprising a lower crossmember base arm and a lower crossmember extension arm in communication via a telescopic joint;
   a first gripping element in communication with said upper end of said first vertical spar;
   a second gripping element in communication with said upper end of said second vertical spar;
   a third gripping element having an adjustment arm, said adjustment arm of said third gripping element in telescopic communication with said lower crossmember base arm;
   a fourth gripping element having an adjustment arm, said adjustment arm of said fourth gripping element in telescopic communication with said lower crossmember extension arm;
   a first holding element in communication with said first vertical spar;
   a second holding element in communication with said second vertical spar;
   a third holding element in communication with said upper crossmember base arm;
   a fourth holding element in communication with said lower crossmember base arm;

a first front leg rotatably affixed to said lower end of said first vertical spar;

a first rear leg rotatably affixed to said lower end of said first vertical spar;

a second front leg rotatably affixed to said lower end of said second vertical spar;

a second rear leg rotatably affixed to said lower end of said second vertical spar;

a first cradle arm having a first cradle arm extension having a first tab, said first cradle arm extension in telescopic communication with said first cradle arm, said first cradle arm rotatably affixed to said lower end of said first vertical spar; and a second cradle arm having a second cradle arm extension having a second tab, said second cradle arm extension in telescopic communication with said second cradle arm, said second cradle arm rotatably affixed to said lower end of said second vertical spar;

wherein said first vertical spar is moveably affixed to said upper crossmember base arm and said lower crossmember base arm, said second vertical spar is moveably affixed to said upper crossmember extension arm and said lower crossmember extension arm to form a frame; and wherein said frame is configured to allow said first vertical spar and said second vertical spar to translate horizontally relative to said upper crossmember and said lower crossmember, and configured to allow said upper crossmember and said lower crossmember to translate vertically relative to said first vertical spar and said second vertical spar to allow said first holding element, said second holding element, said third holding element, and said fourth holding element to adjust independently of said first gripping element, said second gripping element, said third gripping element, and said fourth gripping element to fit the personal electronic device and to allow said first gripping element, said second gripping element, said third gripping element, and said fourth gripping element to adjust to fit the seatback.

10. The mounting device of claim 9, wherein said first gripping element, said second gripping element, said third gripping element, and said fourth gripping element comprise a foot.

11. The mounting device of claim 9, wherein said first holding element, said second holding element, said third holding element and said fourth holding element comprise a tab.

12. The mounting device of claim 1, wherein said first gripping element comprises an adjustment arm, said adjustment arm of said first gripping element in telescopic communication with said lower crossmember base arm and wherein said second gripping element comprises an adjustment arm, said adjustment arm of said fourth gripping element in telescopic communication with said lower crossmember extension arm.

13. The mounting device of claim 12, wherein further comprising a third gripping element and a fourth gripping element, wherein said third gripping element is in communication with an upper end of said first vertical spar and said fourth gripping element is in communication with an upper end of said second vertical spar.

14. The mounting device of claim 1, further comprising a third holding element and a fourth holding element, said third holding element and said fourth holding element disposed orthogonally to said first holding element and said second holding element, said third holding element and said fourth holding element disposed opposite one another such that said first holding element, said second holding element, said third holding element, and said fourth holding element are configured to secure personal electronic equipment.

* * * * *